United States Patent [19]

Hirai et al.

[11] Patent Number: 5,012,493
[45] Date of Patent: Apr. 30, 1991

[54] PHASE DIFFERENCE-ADJUSTING CIRCUIT

[75] Inventors: Ichiro Hirai; Toru Amano, both of Tokyo, Japan

[73] Assignee: NEC Corporation, Japan

[21] Appl. No.: 381,598

[22] Filed: Jul. 18, 1989

[30] Foreign Application Priority Data

Jul. 18, 1988 [JP] Japan .................. 63-177025

[51] Int. Cl.⁵ .................... H04L 1/02; H04L 7/04
[52] U.S. Cl. ...................... 375/100; 375/118
[58] Field of Search .............. 375/38, 40, 102, 100, 375/118; 370/108; 371/1

[56] References Cited

U.S. PATENT DOCUMENTS 3,992,580 11/1976 Bittel et al. .................. 375/118
4,052,670 10/1977 Watanabe et al. ............ 375/118

Primary Examiner—Douglas W. Olms
Assistant Examiner—Marianne Huseman
Attorney, Agent, or Firm—Ostrolenk, Faber, Gerb & Soffen

[57] ABSTRACT

A phase-adjusting circuit for adjusting the phase relation between an input data string supplied via input lines includes sync detecting apparatus provided for each of the lines for generating frame sync-detection signals by detecting frame sync signals of the input data strings. Apparatus is provided for detecting a first data string having a largest delay of the input data strings. A phase difference-detecting apparatus detects phase differences between the first and the remaining data strings to produce phase difference signals for such remaining data strings. A line connecting signal-generating apparatus is responsive to the phase difference signal for generating line connecting signals. A variable-delay apparatus is responsive to the phase difference signals for outputting delayed data strings by giving delays to the remaining data strings. A first switching apparatus responsive to the line connecting signals delivers the remaining data strings to the variable-delay apparatus and outputs the first data string in an undelayed state. A second switching apparatus responsive to the line connecting signals delivers the first data string and the delayed data strings to output lines corresponding to the input lines.

4 Claims, 4 Drawing Sheets

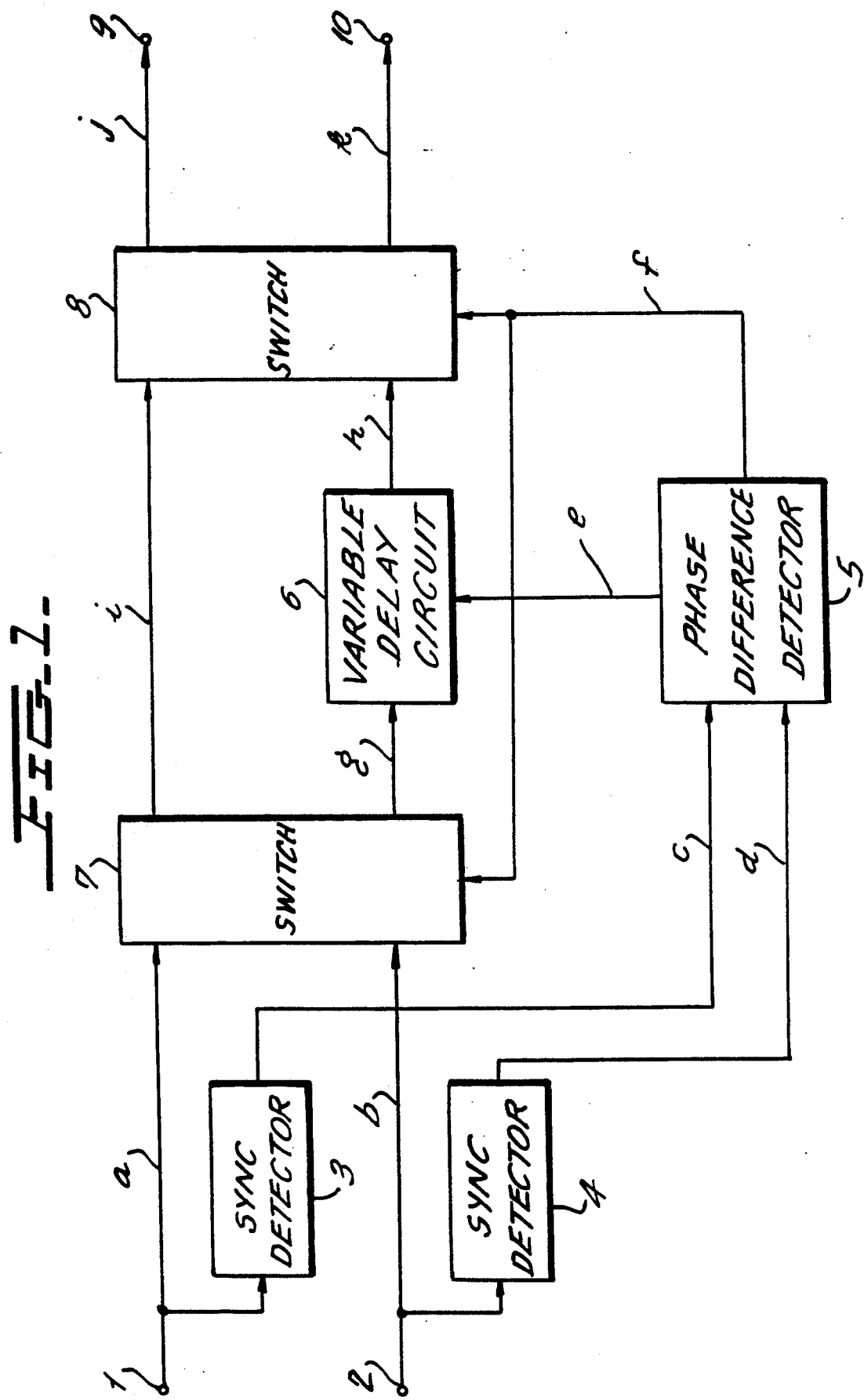

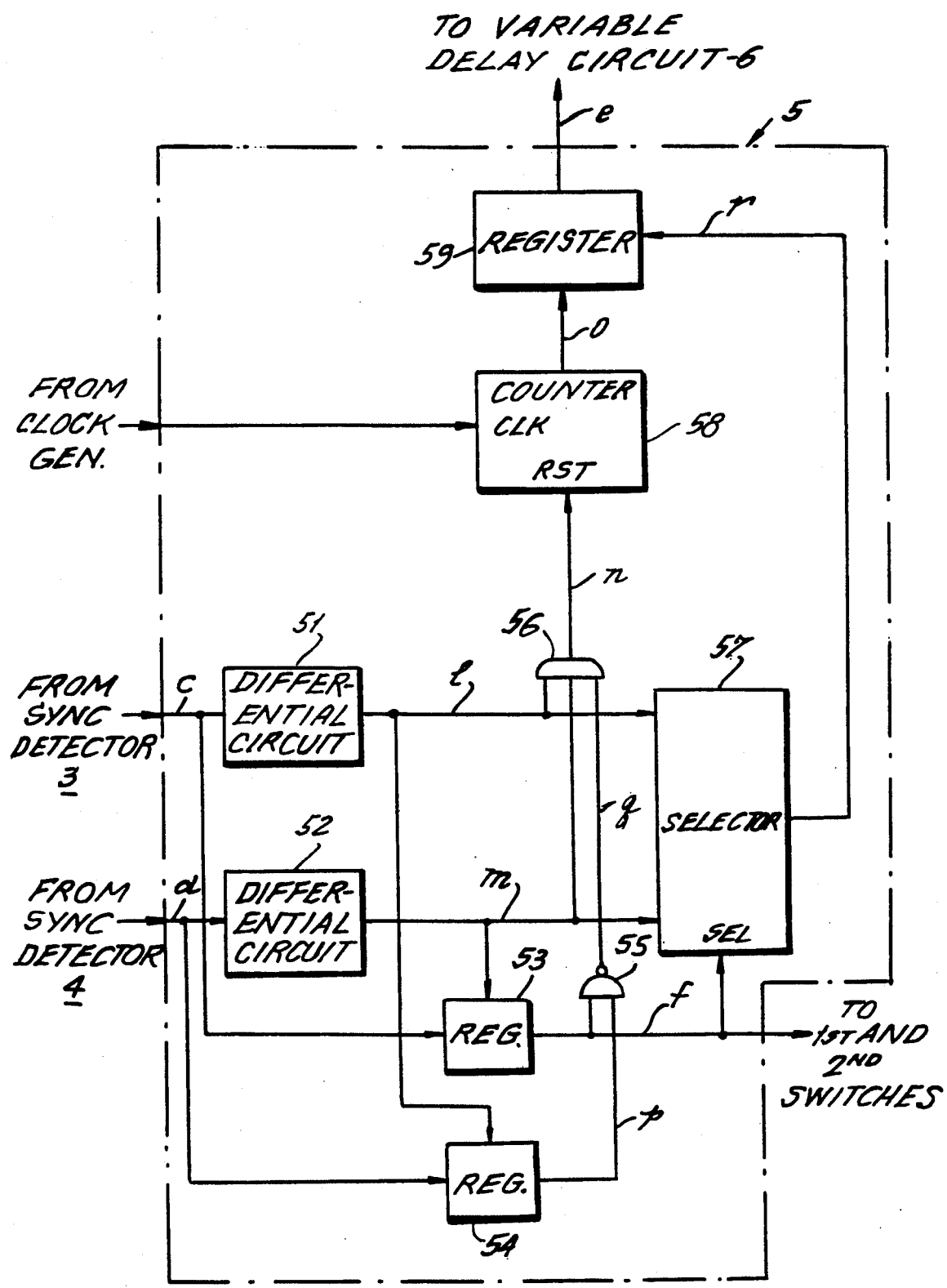

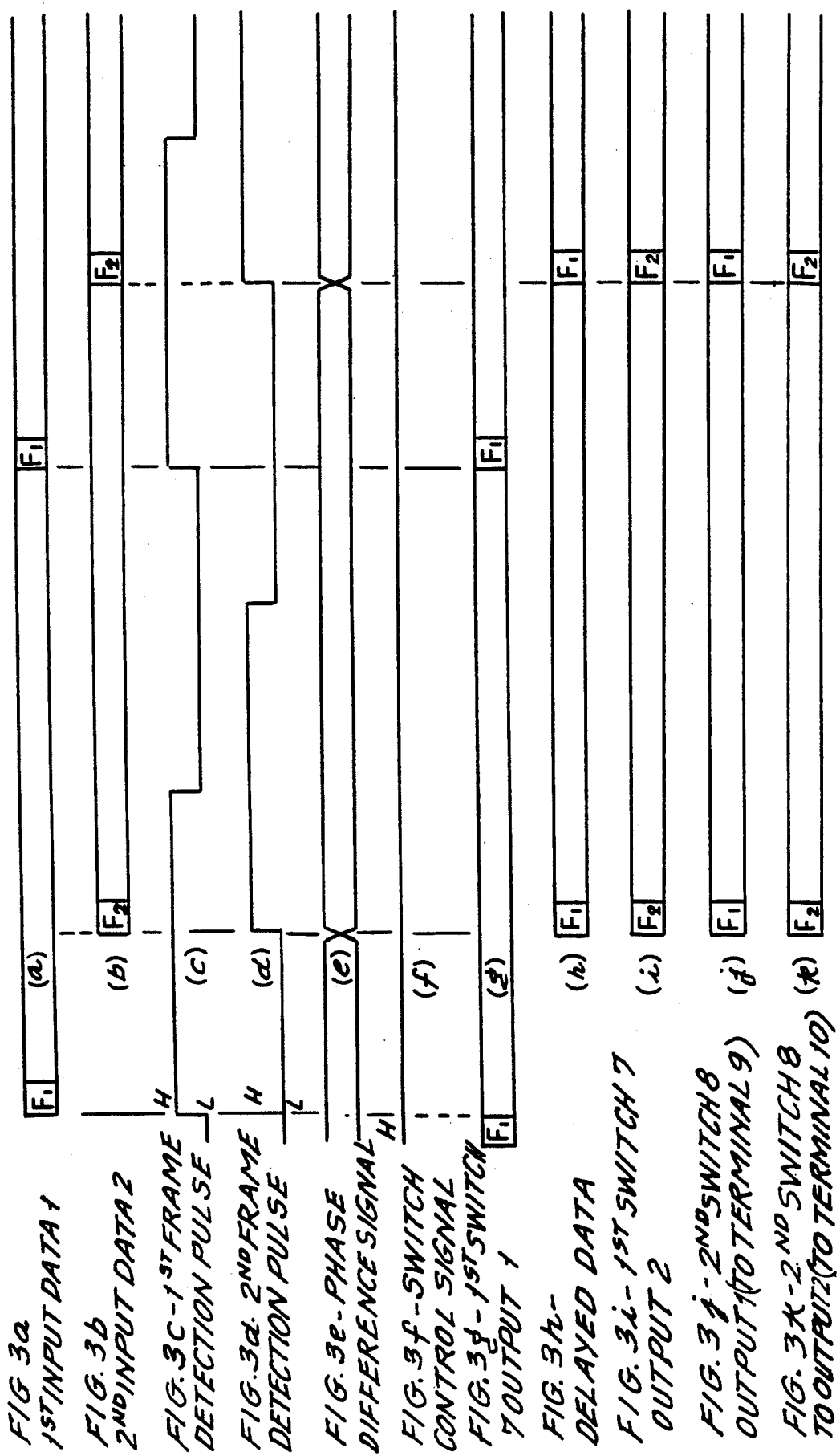

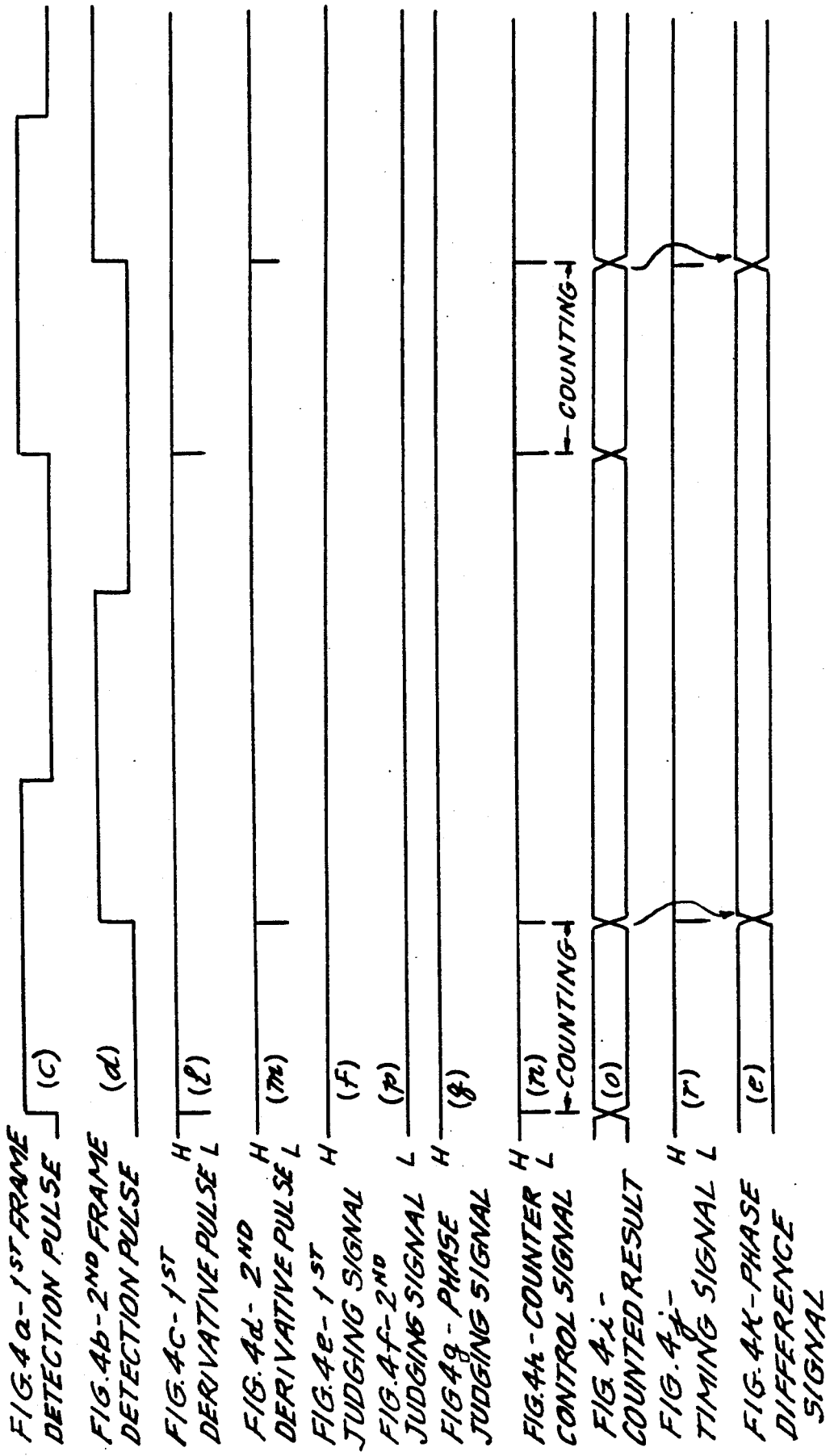

PHASE DIFFERENCE-ADJUSTING CIRCUIT

BACKGROUND OF THE INVENTION

The present invention relates to a phase-adjusting circuit for adjusting the phase difference between signals that are supplied through different transmission lines.

A parallel transmission system for distributing signals to a plurality of transmission lines improves the reliability of communications. In this system, delays differ from one transmission line to another so that it is necessary to provide a phase-adjusting circuit on the reception side in order to adjust for delays or phase difference.

One example of a conventional phase-adjusting circuit is described in Japanese Patent Publication No. 61-24852 (24852/86) by Nishiwaki. The Nishiwaki's circuit comprises memories each being associated with an input line and read and write control circuits, and wherein phase adjustment is performed, by independently writing input data into each memory and orderly reading data from each memory under control of the write and read control circuits. Such a conventional phase-adjusting circuit, however, requires memories and read and write control circuits for each input line resulting in a drawback that the circuit scale tends to become large. In addition, there is also a drawback in that the writing and reading operations of the memories have to be controlled separately, resulting in complicated operations.

SUMMARY OF THE INVENTION

It is an object of the present invention to provide a phase-adjusting circuit with a small circuit scale and simplified operations.

In accordance with the present invention, a phase-adjusting circuit for adjusting a phase difference between a plurality of input data strings, first and second input data strings for example, supplied through two input lines comprises a sync detector for generating first and second sync detection signals by detecting sync signals from the first and second input data strings. A phase relation-signal generator is responsive to the first and second sync detection signals to generate a phase relation signal representing the phase relation between the first and second input data strings. A phase difference detector generates a phase difference signal indicative of the phase difference between the first and second data strings. A first switch is responsive to the phase relation signal to switch the first and second input data strings to produce first and second switched data strings. A variable-delay circuit is responsive to the phase difference signal to delay the second switched data string to produce a delay data string. A second switch is responsive to the phase relation signal to deliver the delay data string and the switched first data string to output lines corresponding to the input lines.

Other features and advantages of the present invention will become apparent from the following description of the invention which refers to the accompanying drawings.

BRIEF DESCRIPTION OF THE DRAWINGS

FIG. 1 is a block diagram showing an embodiment of the present invention;

FIG. 2 is a circuit diagram showing an example of the phase difference-detecting circuit of FIG. 1;

FIGS. 3a to 3k are waveform diagrams for explaining the operation of the circuit shown in FIG. 1; and FIGS. 4a to 4k are waveform diagrams for explaining the operation of the circuit shown in FIG. 2.

DETAILED DESCRIPTION OF THE PREFERRED EMBODIMENT

FIG. 1 is a block diagram showing an embodiment of the present invention, and FIGS. 3a to 3k are waveform diagram for explaining the operation of the circuit of FIG. 1. In the present embodiment, the case will be described in which both of the input and output respectively have two lines. Further, reference letters in parentheses in the captions to FIGS. 3a to 3k correspond to the same letters appearing on signal lines in FIG. 1, and it is assumed the phase relation between the data string a and b is that the phase of the data string a is in advance of the data string b.

In FIG. 1, a first input data string a (FIG. 3a) from a first input terminal 1 is supplied to a first sync detector 3 and a first switch 7, whereas a second input data string b (FIG. 3b) from a second input terminal 2 is supplied to a second sync detector 4 and the first switch 7. The first sync detector 3 detects the frame sync signal or the frame pattern of the first input data string a, and output a first frame detection pulse c (FIG. 3c) to a phase difference detector (PDD) 5. The second sync detector 4 detects the frame sync signal of the second input data string b, and output a second frame detection pulse d (FIG. 3d) to the PDD 5. Both the first and the second frame detection pulses c and d rise at the leading edge and fall at the midpoint of the frame of the corresponding data strings (FIGS. 3c and 3d). The PDD 5 detects the phase difference between the first and the second frame detection pulses c and d and outputs a phase difference signal e (FIG. 3e) to a variable-delay circuit 6. In addition, the PDD 5 decides which of the first and the second input data strings a and b leads in phase, and based on the phase difference, gives a judging signal or switch control signal f (FIG. 3f) to the first and the second switches 7 and 8. The judging signal f goes to "H"0 level when the phase of the data string a is in advance with respect to the phase of the data string b, and goes to "L" level when the phase of the data string b is in advance with respect to the phase of the data string a. In response to the signal f, the first switch 7 delivers a data string having the lead phase of the data strings a and b to the variable-delay circuit as a data string g (FIG. 3g), while it delivers a data string having the logging phase to the second switch as a data string i (FIG. 3i). That is to say, the switch 7 produces the data strings a and b as the data strings g and i when the judging signal f is at "H" level, whereas it produces data strings b and a as the data strings g and i when the signal f is at "L" level. The variable-delay circuit 6 delays the data string g by a delay corresponding to the phase difference signal e given by the PDD 5, and then outputs it to the second switch 8 as a data string h (FIG. 3h) which is in phase with the data string i. The second switch 8, in response to the switch control signal f, produces the data strings h and i as the output data strings j and k when the signal f is at "H" level, whereas it produces the interchanged data strings i and h as the output data strings j and k when the signal f is at "L" level.

Referring to FIG. 2 and FIGS. 4a to 4k, the PDD 5 will now be described in more detail. As in FIG. 1 and FIGS. 3a to 3k, reference letters in parentheses in the captions to FIGS. 4a to 4k correspond to the same letters appearing on signal lines in FIG. 2.

FIG. 4a shows the frame detection pulse of the input data string a produced by the sync detector 3 in FIG. 1, and FIG. 4b shows the frame detection pulse of the input data string b produced by the sync detector 4 in FIG. 1.

A first differential circuit 51 differentiates the first frame detection pulse C (FIG. 4a), and outputs a first derivative pulse l (FIG. 4c) to a second register 54, an AND gate 56 and a selector 57, respectively. A second differential circuit 52 differentiates the second frame detection pulse d (FIG. 4b), and outputs a second derivative pulse m (FIG. 4d) to a first register 53, the AND gate 56 and the selector 57, respectively. The first register 53 samples the first frame detection pulse c with the second derivative pulse m to produce the first judging signal f (FIG. 4e). The first judging signal f goes to "H" level when the phase of the data string a is in advance of the phase of the data string b, whereas it goes to "L" level when the foregoing phases are reversed in order. The first judging signal f is also used as the switch control signal of the switches 7 and 8 (FIG. 1). The second register 54 samples the second frame detection pulse d with the first derivative pulse l to produce a second judging signal p (FIG. 4f). Contrary to the first judging signal f, the second judging signal p goes to "L" level when the phase of the data string a is in advance of the phase of the data string b, whereas it goes to "H" level when the foregoing are reversed in order. A NAND gate 55 decides whether the first and the second judging signals f and p are in phase or not. When the signals f and p are at the same logic level, a phase judging (PD) signal q (FIG. 4g) is set at "L" level, whereas the PD signal q is set at "H" level when the signals are at different logic levels. An AND gate 56 gives the AND operation responsive to the first and the second derivative pulses l and m and the PD signal q to produce a counter control signal n. More specifically, when the PD signal q is at "H" level indicating the presence of a phase difference, the counter 58 counts up clock pulses between the signals n. On the contrary, when the phase judging signal q is at "L" level, the counter control signal n goes to "L" level to stop the operation of the counter 58. A counter 58, which is reset at the trailing edge of the counter control signal n, counts the transmission line clock pulses (sampling clock pulses) which are given by a clock supply source (not shown). When the first and the second input data strings a and b are in phase, the counter control signal n is at logic "L" level due to the PD signal q being at "L" level, so that the counter value remains at zero. Using the first judging signal f as the selection signal, the selector 57 outputs the pulse with more delay of the first and the second derivative pulses l and m to a register 59 as a timing signal r (FIG. 4j). The register 59 is responsive to the timing signal r to store a counted result o (FIG. 4i), and outputs it as a phase difference signal e (FIG. 4k).

As described in the foregoing, the present invention realizes a phase-adjusting circuit with a circuit of minimum scale by detecting the phase differences between the input data strings and delaying the phases of only those data strings having advanced phases.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A phase-adjusting circuit for adjusting the phase relation between input data strings supplied via input lines, comprising:
   sync detecting means provided for each of said lines, for generating frame sync detection signals by detecting frame sync signals of said input data strings;
   means responsive to said frame sync detection signals for detecting a first data string having a largest delay of the input data strings;
   phase difference-detecting means for detecting phase differences between said first data string and remaining data strings other than the first data string to produce phase difference signals for said remaining data strings;
   line connecting signal-generating means responsive to said phase difference signals for generating line connecting signals;
   variable-delay means responsive to said phase difference signals for outputting delayed data strings by giving delays to said remaining data strings;
   first switching means responsive to said line connecting signals for delivering said remaining data strings to said variable-delay means and for outputting said first data string in an undelayed state; and
   second switching means responsive to said line connecting signals for delivering said first data string and said delayed data strings to output lines corresponding to said input lines.

2. A phase-adjusting circuit for adjusting a phase difference between first and second input data strings supplied through first and second input lines, comprising:
   sync detecting means for generating first and second sync detection signals by detecting sync signals from said first and second input data strings;
   phase relation signal-generating means responsive to said first and second sync detection signals for generating a phase relation signal representing the phase relation between said first and second input data strings;
   phase difference-detecting means for generating a phase difference signal indicative of the phase difference between said first and second data strings;
   first switching means responsive to said phase relation signal for switching said first and second input data strings to produce first and second switched data strings;
   variable-delay means responsive to said phase difference signal for delaying said second switched data string to produce a delayed data string; and
   second switching means responsive to said phase relation signal for delivering said delayed data string and said switched first data string to output lines corresponding to said input lines.

3. A phase-adjusting circuit as claimed in claim 2, wherein said phase relation signal-generating means comrpises:
   second differentiating means for generating a second derivative pulse by differentiating said second sync detecting signal; and
   first storage means for storing said first sync detection signal in response to said second derivative pulse and for outputting the stored contents of said first sync detection signal as a first judging signal and said phase signal.

4. A phase-adjusting circuit as claimed in claim 3, wherein said phase difference-detecting means comprising:

first differentiating means for generating a first derivative pulse by differentiating said first sync detection signal;

second storage means for storing said second sync detection signal in response to said first derivative pulse and for outputting the stored contents of said first detection signal as a second judging signal;

control signal-generating means for generating a control signal from said first and second judging signals and said first and second derivative pulses;

counter means for counting clock pulses supplied from outside in accordance with said control signal to produce a counted value;

selection means for outputting either one of said first and second derivative pulses as a write pulse in accordance with said first judging signal; and third storage means for storing said counted values in response to said write pulse to produce said phase difference signal.

* * * * *